US010109064B2

(12) United States Patent
Nash et al.

(10) Patent No.: US 10,109,064 B2
(45) Date of Patent: Oct. 23, 2018

(54) SYSTEM FOR REAL-TIME MOVING TARGET DETECTION USING VISION BASED IMAGE SEGMENTATION

(71) Applicant: Raytheon Company, Waltham, MA (US)

(72) Inventors: Stephen R. Nash, Los Angeles, CA (US); Christopher A. Leddy, Huntington Beach, CA (US); Hector A. Quevedo, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/500,369

(22) PCT Filed: Sep. 1, 2015

(86) PCT No.: PCT/US2015/047933
§ 371 (c)(1),
(2) Date: Jan. 30, 2017

(87) PCT Pub. No.: WO2016/085552
PCT Pub. Date: Jun. 2, 2016

(65) Prior Publication Data
US 2017/0228875 A1    Aug. 10, 2017

Related U.S. Application Data

(60) Provisional application No. 62/073,571, filed on Oct. 31, 2014.

(51) Int. Cl.
*G06K 9/00* (2006.01)
*G06T 7/215* (2017.01)
(Continued)

(52) U.S. Cl.
CPC ............... *G06T 7/215* (2017.01); *G06T 7/11* (2017.01); *G06T 7/74* (2017.01); *G06K 9/00* (2013.01);
(Continued)

(58) Field of Classification Search
None
See application file for complete search history.

(56) References Cited

U.S. PATENT DOCUMENTS

| 2012/0045090 | A1* | 2/2012 | Bobbitt | G06K 9/00771 382/103 |
| 2016/0005154 | A1* | 1/2016 | Meyers | G06T 5/007 382/274 |

OTHER PUBLICATIONS

D.G. Bailey et al., "Single Pass Connected Components Analysis," Field-Programmable Technology, 2008, International Conference on Dec. 1, 2007, pp. 282-287, XP055267842.
(Continued)

*Primary Examiner* — Vikkram Bali
(74) *Attorney, Agent, or Firm* — Burns & Levinson, LLP; Joseph M. Maraia (57) ABSTRACT

A system for processing video signal information to identify those pixels associated with a moving object in the presence of platform and/or sensor pointing induced motion. Frame differencing with self-adjusting noise thresholds is implemented to detect pixels associated with objects that are in motion with respect to the background and a field-by-field motion pixel map of pixels associated with the moving object is generated. A two (2) step pixel grouping process is used where the first pass runs in real-time as the video signal is received and writes the links between pixel groups into entries in a table. The second pass operates on a smaller set of link data and only needs to reorder entries in the table.

20 Claims, 10 Drawing Sheets (51) Int. Cl.
*G06T 7/11* (2017.01)
*G06T 7/73* (2017.01)
*G06T 7/20* (2017.01)

(52) U.S. Cl.
CPC ...... *G06T 7/20* (2013.01); *G06T 2207/20128* (2013.01)

(56) References Cited

OTHER PUBLICATIONS

Lubomir Riha et al., "GPU Accelerated One-Pass Algorithm for Computing Minimal Rectangles of Connected Components," Applications of Computer Vision (WACV), 2011 IEEE Workshop On, IEEE, Jan. 5, 2011, pp. 479-484, XP031913612.

Prasad Gabbur et al., "A Fast Connected Components Labeling Algorithm and its Application to Real-Time Pupil Detection," Machine Vision and Applications, Springer, Berlin, DE, vol. 21, No. 5, Jan. 24, 2009, pp. 779-787, XP019836921.

International Search Report and Written Opinion from related PCT Application No. PCT/US2015/047933 dated May 4, 2016.

* cited by examiner

MOTION MAP 216

| MP(Y,X) | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 0 | 0 | 1 | 1 | 0 | 0 | 1 | 1 | 0 |
| 3 | 0 | 0 | 1 | 1 | 0 | 0 | 1 | 1 | 0 |
| 4 | 0 | 1 | 1 | 1 | 1 | 1 | 1 | 1 | 0 |
| 5 | 0 | 1 | 1 | 1 | 1 | 1 | 1 | 1 | 0 |
| 6 | 0 | 0 | 0 | 0 | 0 | 0 | 0 | 0 | 0 |

FIG. 3

GROUP-COUNT TABLE 400

| GCV(Y,X) | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 0 | 0 | 1 | 1 | 0 | 0 | 2 | 2 | 0 |
| 3 | 0 | 0 | 1 | 1 | 0 | 0 | 2 | 2 | 0 |
| 4 | 0 | 3 | 3 | 3 | 3 | 3 | 3 | 3 | 0 |
| 5 | 0 | 3 | 3 | 3 | 3 | 3 | 3 | 3 | 0 |
| 6 | 0 | 0 | 0 | 0 | 0 | 0 | 0 | 0 | 0 |

FIG. 4

MOTION MAP 216

| MP(Y,X) | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 0 | 0 | 1 | 1 | 0 | 0 | 1 | 1 | 0 |

| MP(Y,X) | 1 | 2 | 3 | 4 | 5 | 6 | 7 | 8 | 9 |
|---|---|---|---|---|---|---|---|---|---|
| 2 | 0 | 0 | 1 | 1 | 0 | 0 | 1 | 1 | 0 |
| 3 | 0 | 0 | 1 | 1 | 0 | 0 | 1 | 1 | 0 |

| MP(Y,X) | 1 | 2 | 3 | 4 | 5 | 6 | 7 | 8 | 9 |
|---|---|---|---|---|---|---|---|---|---|
| 3 | 0 | 0 | 1 | 1 | 0 | 0 | 1 | 1 | 0 |
| 4 | 0 | 1 | 1 | 1 | 1 | 1 | 1 | 1 | 0 |

| MP(Y,X) | 1 | 2 | 3 | 4 | 5 | 6 | 7 | 8 | 9 |
|---|---|---|---|---|---|---|---|---|---|
| 4 | 0 | 1 | 1 | 1 | 1 | 1 | 1 | 1 | 0 |
| 5 | 0 | 1 | 1 | 1 | 1 | 1 | 1 | 1 | 0 |

| MP(Y,X) | 1 | 2 | 3 | 4 | 5 | 6 | 7 | 8 | 9 |
|---|---|---|---|---|---|---|---|---|---|
| 5 | 0 | 1 | 1 | 1 | 1 | 1 | 1 | 1 | 0 |
| 6 | 0 | 0 | 0 | 0 | 0 | 0 | 0 | 0 | 0 |

FIG. 5.5

GROUPING TABLE

| GCV(Y,X) | GCV | Indirect (Adjacent) 608 | Y_Start 612 | Y_Stop 616 | X_Start 620 | X_Stop 624 |
|---|---|---|---|---|---|---|
| 2,3 | 1 | 0 | 2 | 2 | 3 | 3 |

| GCV(Y,X) | GCV | Indirect (Adjacent) | Y_Start | Y_Stop | X_Start | X_Stop |
|---|---|---|---|---|---|---|
| 2,4 | 1 | 0 | 2 | 2 | 3 | 4 |

| GCV(Y,X) | GCV | Indirect (Adjacent) | Y_Start | Y_Stop | X_Start | X_Stop |
|---|---|---|---|---|---|---|
| 2,7 | 1 | 0 | 2 | 2 | 3 | 4 |
|  | 2 | 0 | 2 | 2 | 7 | 7 |

| GCV(Y,X) | GCV | Indirect (Adjacent) | Y_Start | Y_Stop | X_Start | X_Stop |
|---|---|---|---|---|---|---|
| 2,8 | 1 | 0 | 2 | 2 | 3 | 4 |
|  | 2 | 0 | 2 | 2 | 7 | 8 |

| GCV(Y,X) | GCV | Indirect (Adjacent) | Y_Start | Y_Stop | X_Start | X_Stop |
|---|---|---|---|---|---|---|
| 3,3 | 1 | 0 | 2 | 3 | 3 | 4 |
|  | 2 | 0 | 2 | 2 | 7 | 8 |

| GCV(Y,X) | GCV | Indirect (Adjacent) | Y_Start | Y_Stop | X_Start | X_Stop |
|---|---|---|---|---|---|---|
| 3,7 | 1 | 0 | 2 | 3 | 3 | 4 |
|  | 2 | 0 | 2 | 3 | 7 | 8 |

| GCV(Y,X) | GCV | Indirect (Adjacent) | Y_Start | Y_Stop | X_Start | X_Stop |
|---|---|---|---|---|---|---|
| 4,2 | 1 | 0 | 2 | 3 | 3 | 4 |
|  | 2 | 0 | 2 | 3 | 7 | 8 |
|  | 3 | 0 | 4 | 4 | 2 | 2 |

| GCV(Y,X) | GCV | Indirect (Adjacent) | Y_Start | Y_Stop | X_Start | X_Stop |
|---|---|---|---|---|---|---|
| 4,3 | 1 | 0 | 2 | 4 | 2 | 4 |
| | 2 | 0 | 2 | 3 | 7 | 8 |
| | 3 | 1 | 4 | 4 | 2 | 2 |

FIG. 6.8

| GCV(Y,X) | GCV | Indirect (Adjacent) | Y_Start | Y_Stop | X_Start | X_Stop |
|---|---|---|---|---|---|---|
| 4,5 | 1 | 0 | 2 | 4 | 2 | 5 |
| | 2 | 0 | 2 | 3 | 7 | 8 |
| | 3 | 1 | 4 | 4 | 2 | 2 |

FIG. 6.9

| GCV(Y,X) | GCV | Indirect (Adjacent) | Y_Start | Y_Stop | X_Start | X_Stop |
|---|---|---|---|---|---|---|
| 4,6 | 1 | 0 | 2 | 4 | 2 | 6 |
| | 2 | 0 | 2 | 3 | 7 | 8 |
| | 3 | 1 | 4 | 4 | 2 | 2 |

| GCV(Y,X) | GCV | Indirect (Adjacent) | Y_Start | Y_Stop | X_Start | X_Stop | | Link Count | Col 1 704 | Col 2 708 |
|---|---|---|---|---|---|---|---|---|---|---|
| 4,7 | 1 | 0 | 2 | 4 | 2 | 7 | | 1 | 2 | 1 |
|  | 2 | 0 | 2 | 3 | 7 | 8 | |  |  |  |
|  | 3 | 1 | 4 | 4 | 2 | 2 | |  |  |  |

FIG. 7.2

| GCV(Y,X) | GCV | Indirect (Adjacent) | Y_Start | Y_Stop | X_Start | X_Stop | | Link Count | Col 1 704 | Col 2 708 |
|---|---|---|---|---|---|---|---|---|---|---|
| 4,8 | 1 | 0 | 2 | 4 | 2 | 8 | | 1 | 2 | 1 |
|  | 2 | 0 | 2 | 3 | 7 | 8 | |  |  |  |
|  | 3 | 1 | 4 | 4 | 2 | 2 | |  |  |  |

FIG. 7.3

Table 600:

| GCV(Y,X) | GCV | Indirect (Adjacent) | Y_Start | Y_Stop | X_Start | X_Stop |
|---|---|---|---|---|---|---|
| 5,2 | 1 | 0 | 2 | 5 | 2 | 8 |
|  | 2 | 0 | 2 | 3 | 7 | 8 |
|  | 3 | 1 | 4 | 4 | 2 | 2 |

Table 700:

| Link Count | Col 1 704 | Col 2 708 (730) |
|---|---|---|
| 1 | 2 | 1 |
|  |  |  |
|  |  |  |

FIG. 7.4

Table 600:

| GCV(Y,X) | GCV | Indirect (Adjacent) | Y_Start | Y_Stop | X_Start | X_Stop |
|---|---|---|---|---|---|---|
| 5,2 | 1 | 0 | 2 | 5 | 2 | 8 |
|  | 2 | 1 | 2 | 3 | 7 | 8 |
|  | 3 | 1 | 4 | 4 | 2 | 2 |

Table 700:

| Link Count | Col 1 704 | Col 2 708 (730) |
|---|---|---|
| 1 | 2 | 1 |
|  |  |  |
|  |  |  |

| MP(Y,X) | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 0 | 0 | 1 | 1 | 0 | 0 | 1 | 1 | 0 |
| 3 | 0 | 0 | 1 | 1 | 0 | 0 | 1 | 1 | 0 |
| 4 | 0 | 1 | 1 | 1 | 1 | 1 | 1 | 1 | 0 |
| 5 | 0 | 1 | 1 | 1 | 1 | 1 | 1 | 1 | 0 |
| 6 | 0 | 0 | 0 | 0 | 0 | 0 | 0 | 0 | 0 |

FIG. 8

SYSTEM FOR REAL-TIME MOVING TARGET DETECTION USING VISION BASED IMAGE SEGMENTATION

CROSS-REFERENCE TO RELATED APPLICATION

This application claims priority of U.S. Provisional Patent Application Ser. No. 62/073,571 for "Systems and Methods of Real-Time Vision Based Segmentation for Moving Target Detection," filed Oct. 31, 2014. The entire contents of which is incorporated by reference herein for all purposes.

STATEMENT REGARDING FEDERALLY SPONSORED RESEARCH OR DEVELOPMENT

This invention was conceived with United States government support under ATFLIR H10 Contract #578927 awarded by the Department of Defense. The United States government has certain rights in the present disclosure.

BACKGROUND OF THE INVENTION

Detecting and tracking moving objects is a very challenging image processing problem. Conventional image detection algorithms can help acquire moving objects but they often fail when the sensor or platform is moving.

Specifically, known detection systems use segmentation algorithms that implement thresholding, histogram-based methods, edge detection, clustering and region growing. Many of these methods require complex systems because of the processing that is required and can break down when the sensor and/or the platform are in motion. Although region labeling may be typically done it involves making multiple passes through the data after it is all available and this requires large amounts of memory and is processor intensive.

What is needed, therefore, is a system that provides for the ability to detect moving targets in the presence of platform and/or sensor pointing induced motion without the need for complex processing requirements.

BRIEF SUMMARY OF THE INVENTION

Embodiments of the present invention are directed to a system for efficiently processing video signal information in order to identify which pixels in the signal are associated with a moving object. Moving objects or targets are detected in the presence of platform and/or sensor pointing induced motion. Once the "moving" pixels in an image are identified, embodiments of the present invention provide a system and method to segment and region label these "moving" pixels in real time. Once the pixels are grouped, the position can be passed, for example, to a tracker to assist in target acquisition.

Embodiments of the present invention use registered frame differencing with self-adjusting noise thresholds to detect pixels associated with objects that are in motion with respect to the background. A field-by-field "motion" pixel map of all pixels associated with moving objects is generated.

Further, embodiments of the present invention implement an efficient two (2) step pixel grouping process. The first pass through the data runs, effectively, in real-time as the video signal is received and writes the links between pixel groups into a Group Table. Advantageously, only a relatively few video lines need to be buffered and, therefore, only a small amount of memory is necessary to store the coordinates and links, as will be described in more detail below. The second pass operates on a smaller set of link data and only needs to reorder entries.

This method requires fewer iterations through the data than typical single or double pass systems as are known in the art.

In one embodiment of the present invention, a method of detecting a moving object in an image signal comprising a plurality of sequential image frames of a plurality of pixels (P), comprises, for each image frame: receiving, for each pixel (P) in the frame, a corresponding motion map pixel (MP) set to either a first motion value (FMV) or a second motion value (SMV) indicating that the pixel (P) is associated or is not associated, respectively, with an object in the image frame that is in motion with respect to a background; assigning a group count value (GCV) to each motion map pixel (MP) as a function of the motion values of adjacent motion map pixels; maintaining an indexed grouping table comprising outer pixel coordinates for a boundary about each group of pixels having a same group count value (GCV) and information representing two groups of pixels having different group count values adjacent to one another; determining if two different groups of pixels having different group count values are adjacent to one another by comparing the group count value (GCV) for each respective motion map pixel MP to the GCVs of two adjacent motion map pixels and, if so determined, updating the outer pixel coordinates of the group count value for the adjacent motion map pixel in the indexed grouping table; maintaining a multiple link table including information identifying a motion map pixel having a group count value GCV adjacent to two other motion map pixels each having a different group count value GCV; and traversing the indexed grouping table and the multiple link table and determining pixel coordinates for a boundary that encompasses two or more adjacent groups of pixels having different group count values to identify the moving object in the frame.

In another embodiment of the present invention, a system for detecting a moving object in an image signal comprising a plurality of sequential image frames of a plurality of pixels (P), comprises an object detection module configured to, for each frame: receive, for each pixel (P) in the frame, a corresponding motion map pixel (MP) having either a first motion value (FMV) or a second motion value (SMV) indicating that the pixel (P) is associated or is not associated, respectively, with an object in the image frame that is in motion with respect to a background; assign a group count value (GCV) to each motion map pixel (MP) as a function of the motion values of adjacent motion map pixels; maintain an indexed grouping table comprising outer pixel coordinates for a boundary about each group of pixels having a same group count value (GCV) and information representing two groups of pixels having different group count values adjacent to one another; determine if two different groups of pixels having different group count values are adjacent to one another by comparing the group count value (GCV) for each respective motion map pixel MP to the GCVs of two adjacent motion map pixels and, if so determined, update the outer pixel coordinates of the group count value for the adjacent motion map pixel in the indexed grouping table; maintain a multiple link table including information identifying a motion map pixel having a group count value GCV adjacent to two other motion map pixels each having a different group count value GCV; and traverse the indexed grouping table and the multiple link table and determine pixel coordinates for a boundary that encompasses two or more adjacent groups of pixels having different group count values to identify the moving object in the frame.

Still further, in another embodiment of the present invention a method of detecting a moving object in an image signal comprising a plurality of sequential image frames of a plurality of pixels (P), comprises: receiving, for each pixel (P) in the frame, either a first motion value (FMV) or a second motion value (SMV) indicating, respectively, that the pixel (P) is part of an object in the image that is in motion with respect to a background; assigning a group count value (GCV) to each pixel as a function of the motion values of adjacent pixels; maintaining an indexed data store comprising outer pixel coordinates for a boundary about each group of pixels having a same group count value (GCV) and information representing two groups of pixels having different group count values adjacent to one another; determining if two different groups of pixels having different group count values are adjacent to one another by comparing the group count value (GCV) for each respective pixel to the GCVs of two adjacent pixels and, if so determined, updating the outer pixel coordinates of the group count value for the adjacent motion map pixel in the data store; maintaining a multiple link data store including information identifying a pixel having a group count value GCV adjacent to two other pixels each having a different group count value GCV; and traversing the indexed data store and the multiple link data store and determining pixel coordinates for a boundary that encompasses two or more adjacent groups of pixels having different group count values to identify the moving object in the frame.

BRIEF DESCRIPTION OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures:

FIGS. 5.1-5.5 represent the processing of the motion map in accordance with an embodiment of the present invention;

FIGS. 6.1-6.10 represent the processing of a grouping table in accordance with an embodiment of the present invention;

FIGS. 7.1-7.4 represent the processing of the grouping table and a multi-link table in accordance with an embodiment of the present invention.

DETAILED DESCRIPTION

This application claims priority of U.S. Provisional Patent App. Ser. No. 62/073,571 for "Systems and Methods of Real-Time Vision Based Segmentation for Moving Target Detection," filed Oct. 31, 2014, the entire contents of which is incorporated by reference herein for all purposes.

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 1:
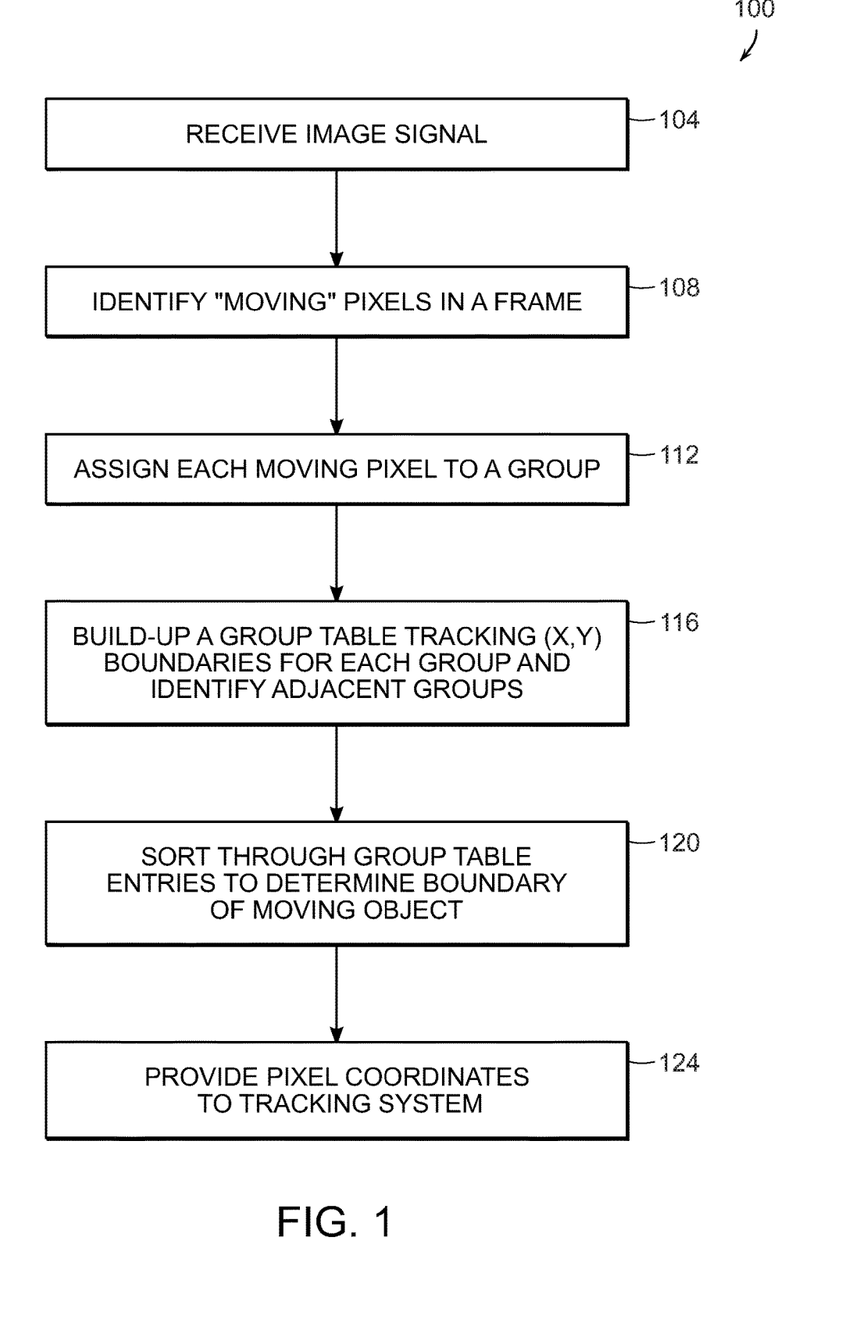
FIG. 1 is a flowchart of a method in accordance with an embodiment of the present invention.

Referring now to FIG. 1, embodiments of the present invention implement a method 100 of identifying a moving object in an image where the image signal is received, step 104, and from which moving pixels in each frame of the image signal are identified, step 108. Subsequently, step 112, each moving pixel in a frame is assigned a group value, as will be explained in more detail below. A grouping table is maintained that tracks the pixel boundaries for each group value and identifies adjacent groups, step 116, and which will also be described in more detail below. Once the grouping table entries have been completed, that is, once all of the motion map pixels in the frame have been processed, then the grouping table entries are sorted to determine a boundary of the moving object in that frame, step 120. The object boundaries are provided to, for example, but not limited to, a target tracking system, step 124.

Figure 2A:
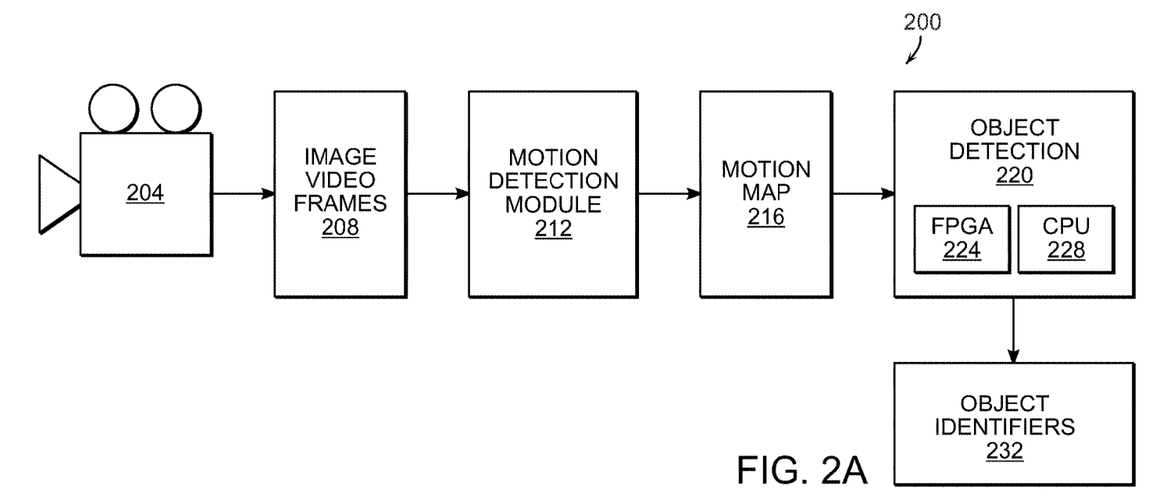
FIGS. 2A & 2B are block diagrams of an embodiment of the present invention.

As shown in FIG. 2A, in one embodiment of the present invention a system 200 for implementing the method of detection 100 is provided. At the front of the system 200 is an image capture device 204, for example, a digital video camera or the like, as is well known in the art. The image capture device 204 provides an image signal including a plurality of sequential image video frames 208 of a plurality of pixels to a motion detection module 212. The methods and apparatuses for identifying pixels in an image frame that may be associated with a moving object are known in the art. In one non-limiting example, the system described in U.S. Patent Publication 2015-0097975 entitled "Integrating Image Frames," published on Apr. 9, 2015, the entire contents of which is hereby incorporated by reference, may be implemented to identify the pixels. The motion detection module 212 provides a motion map 216 to an object detection module 220 that includes, in one non-limiting embodiment, a Field Programmable Gate Array (FPGA) 224 and a microprocessor or Central Processing Unit (CPU) 228. The object detection module 220 provides the object identifiers 232 to, for example, a tracking system.

Figure 2B:
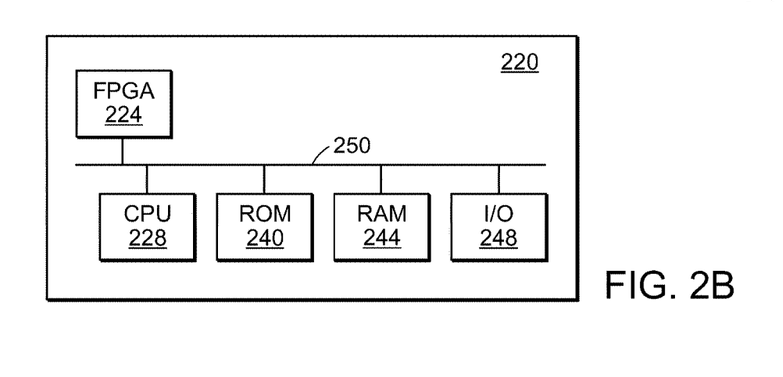

Referencing FIG. 2B, the object detection module 220 includes the CPU 228, a Read Only Memory (ROM) device 240, a Random Access Memory (RAM) device 244, an I/O device 248 and a bus 250. As shown, these devices communicate with one another using the bus 250. A protocol used for communicating among the devices and across the bus 250 can be any one of a number of known protocols. Further, while only one bus is shown, one of ordinary skill in the art will understand that multiple busses could be implemented where only certain devices are on a respective bus in communication with one another and some devices may not be on the same bus as others. Further, and not shown here, but that which would be understood by one of ordinary skill in the art, are the ancillary devices necessary for the proper operation of the microprocessor and the FPGA, etc. such as, for example, a power supply or a wired or wireless network connection.

Figure 3:
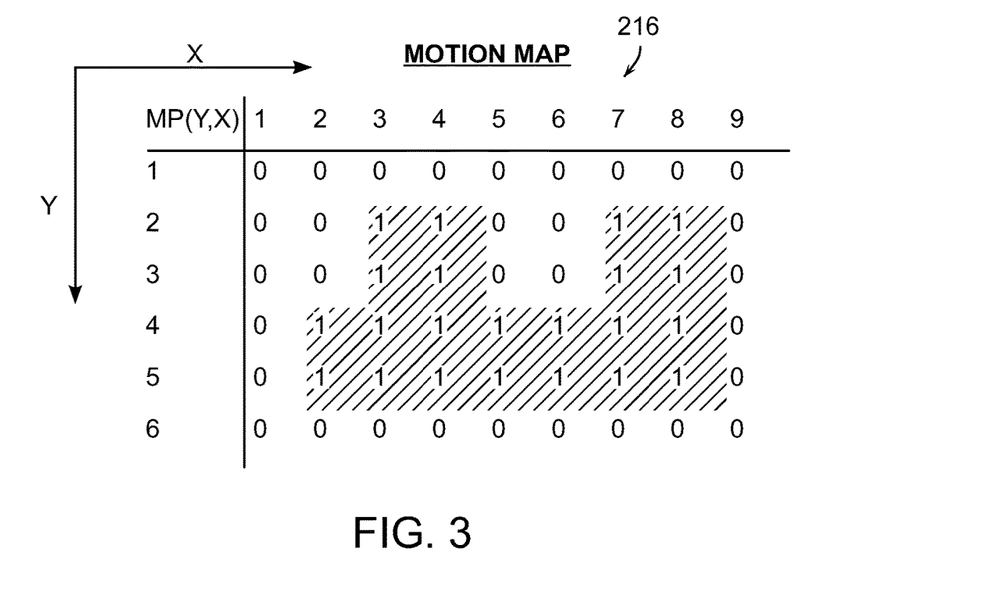
FIG. 3 is a motion map in accordance with an embodiment of the present invention.

Referring now to FIG. 3, the motion map 216, for explanatory purposes only, consists of a plurality of motion map pixels (MP) arranged in a series of rows and columns where a specific motion map pixel has coordinates (Y, X) to identify its location, where Y represents the row and X represents the column. As a convention, the motion map pixels are provided as a stream of values starting at the upper left location (1, 1) moving along the row and down the columns (1, 2), (1,3) . . . (2,1)(2,2) . . . (6,8), (6,9). Further, and also for purposes of explanation, each motion map pixel MP that has been identified as associated with a moving object in the frame will be given a value of "1," i.e., a first motion value (FMV) and that a motion map pixel that is not representing a moving object will be provided with a value of "0," i.e., a second motion value (SMV) Of course, one of ordinary skill in the art will understand that there are other ways to represent the distinction between a moving or a nonmoving pixel the choice of which, however, is not germane to the invention being described herein.

Figure 4:
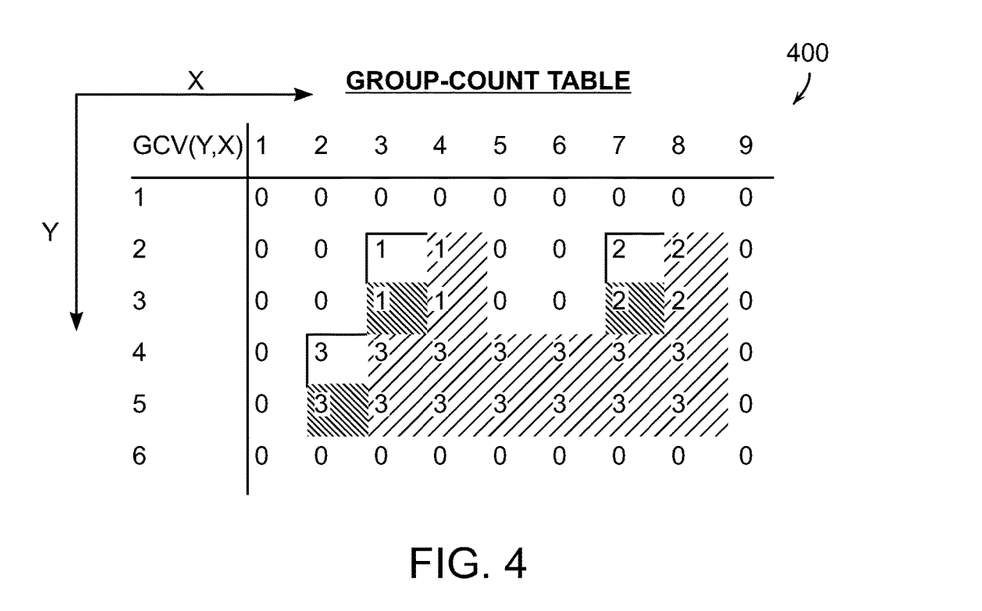
FIG. 4 is a group_count table in accordance with an embodiment of the present invention.

In a first phase of the method according to the present invention, each motion map pixel MP in the motion map 216 is processed in order to assign it a respective group count value (GCV) in order to arrive at a group_count table 400, as shown in FIG. 4. Each motion map pixel is provided with a group count value (GCV) as a function of the values of two adjacent motion map pixels: the one above and the one to the left. In other words, for a given motion map pixel MP(Y, X), its group count value is determined as a function of the values of the motion map pixel above MP(Y−1,X) and the one to the left MP(Y,X−1). The operation of assigning group count values can be described with the following pseudo-code, where the current group count value (CGCV), "Count" in the pseudo-code, is initially set to "1:"

```
IF (MP(Y, X)=1 and MP(Y-1, X)=0 and MP(Y, X-1)=0) then
    (a) GCV(Y, X) = Count
    (b) Count = Count + 1
Else If(MP(Y, X)=1 and MP(Y, X-1)=1) then GCV(Y, X) = GCV(Y, X-1) /*left*/
Else If (MP(Y, X)=1 and MP(Y-1, X)=1) then GCV(Y, X) = GCV(Y-1, X) /*top*/
```

It should be noted that reference to a "table" or "map" are representations chosen for explanatory purposes and other data structures or "data stores" for storing the same information would be apparent to those of ordinary skill in the art.

Advantageously, as the determination of a motion map pixel's group count value only uses values from the current row and the immediately prior row of pixels, only those two rows need be stored. This makes for a very compact and efficient process that does not require a large amount of memory to implement. In one embodiment of the present invention, the FPGA 224 may be used to make this determination thus performing the analysis with greater speed than by using the microprocessor 228 although, in an alternate embodiment, of course, the microprocessor 228, properly programmed as described herein, could be used.

Referring now to FIGS. 5.1 to 5.5, the assignment of group count values will be explained. As there are no "moving" pixels in the first row of motion map pixels, all of the locations in the first row of the group count table 400 are set to "0." The first "moving" motion map pixel is found at the location (2, 3) and the respective location in the group count table is given the group count value of "1." The next motion map pixel located at (2, 4) is also given the group count value of "1" because its left adjacent motion map pixel is also "moving," that is, is set to "1." The next "moving" motion map pixel is located at (2, 7) but because the motion map pixel to the left is not "moving" this motion map pixel is assigned the next group count value, that is, "2." Moving through the remainder of the motion map pixels there is one more group count value assigned starting at location (2, 2), assigned "3," and with respect to the foregoing description and the pseudo-code, one of ordinary skill in the art should understand how this group count value is assigned to the remaining motion map pixels.

Figure 61:
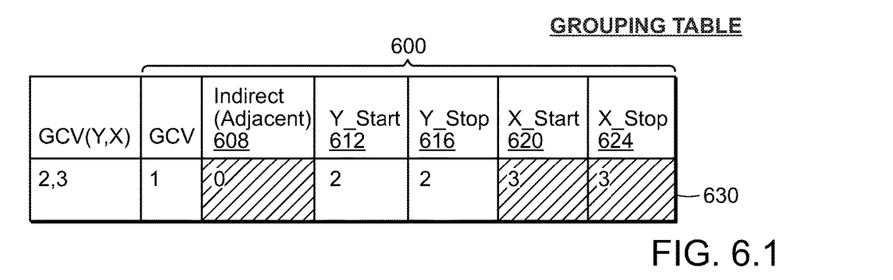

As the group count values are being assigned to the motion map pixels, a grouping table 600 is being built in memory to keep track of the outermost coordinates of the boundary pixels for each group. The grouping table 600 contains five elements of information for each group count value GCV:
- an Indirect (Adjacent) index 608, which identifies an adjacent group;
- a Y_Start value 612, the starting row for the group count value;
- a Y_Stop value 616, the ending row for the group count value;
- an X_Start value 620, the starting column for the group count value; and
- an X_Stop value 624, the ending column value for the group count value.

The Indirect (adjacent) index links, i.e., identifies, that one group is adjacent to another group. As a result, the index into the grouping table 600 can be direct or indirect where, for direct indexing, the group count value will be the index into the table. If the indirect (adjacent) index is nonzero, then the value in that entry will be the index into the group count table. This is expressed in the following pseudo-code example:

```
index = Group_Count(y, x) /* direct index */
If(Indirect(index) != 0) then Index = Indirect(index) /* indirect index */
```

The outermost coordinates for the group of moving pixels are stored in the grouping table 600 as per the following pseudo-code:

```
If (y < Y_Start(index) or Y_Start(index)=0) then Y_Start(index) = y
If (y > Y_Stop(index)) then Y_Stop(index) = y
If (x < X_Start(index) or X_Start(index)=0) then X Start(index) = x
If (x > X_Stop(index)) then X_Stop(index) = x
Where: y, x = current position in the motion map pixel data.
```

The grouping table 600 is updated as the GCVs are assigned, where the progression of the group count table is presented in FIGS. 6.1 through 6.10, which will be discussed in more detail below.

As the GCVs are entered into the group count table 400, the grouping table 600 is updated for each non-zero GCV. Referring to FIG. 6.1, the first non-zero GCV is at GCV(2, 3)=1 so a first entry 630 is recorded where the Indirect (Adjacent) value is "0" because there is no adjacent motion map pixel of a different value, the Y_Start value 612 is 2, the Y_Stop value 616 is 2, the X_Start value 620 is 3; and the X_Stop value 624 is 3.

Figure 62:
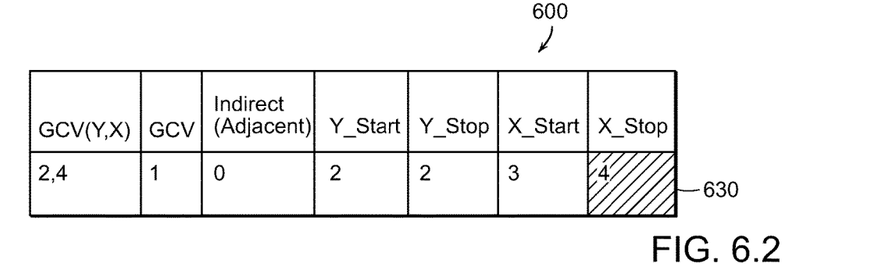

The next non-zero GCV(2,4)=1, which already has an entry 630 where the Indirect (Adjacent) value remains "0" because there is no adjacent motion map pixel of a different value, the Y_Start value 612 is still 2, the Y_Stop value 616 is still 2, the X_Start value 620 is still 3; but the X_Stop value 624 (shaded) is now changed to 4 to reflect the new value, as shown in FIG. 6.2.

Figure 63:
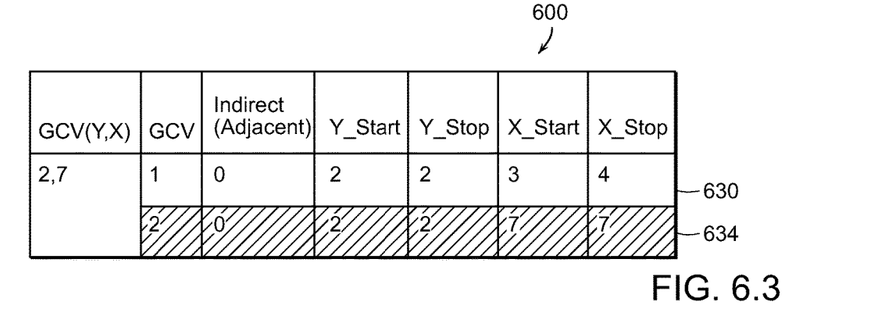

Continuing, the next non-zero GCV(2,7)=2, referring to FIG. 6.3, which does not already have an entry, so a new entry 634 (shaded) where the Indirect (Adjacent) value remains "0" because there is no adjacent motion map pixel of a different value, the Y_Start value 612 is 2, the Y_Stop value 616 is 2, the X_Start value 620 is 7; and the X_Stop value 624 is 7.

Figure 64:
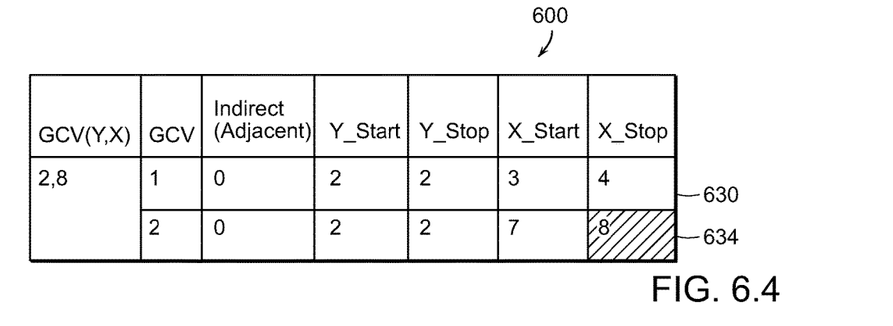

Continuing, the next non-zero GCV is at GCV(2,8)=2, referring to FIG. 6.4, which already has an entry 634 where the Indirect (Adjacent) value remains "0" because there is no adjacent motion map pixel of a different value, the X_Stop value 624 (shaded) is updated to 8 and all other values remain unchanged.

Figures 65, 66:
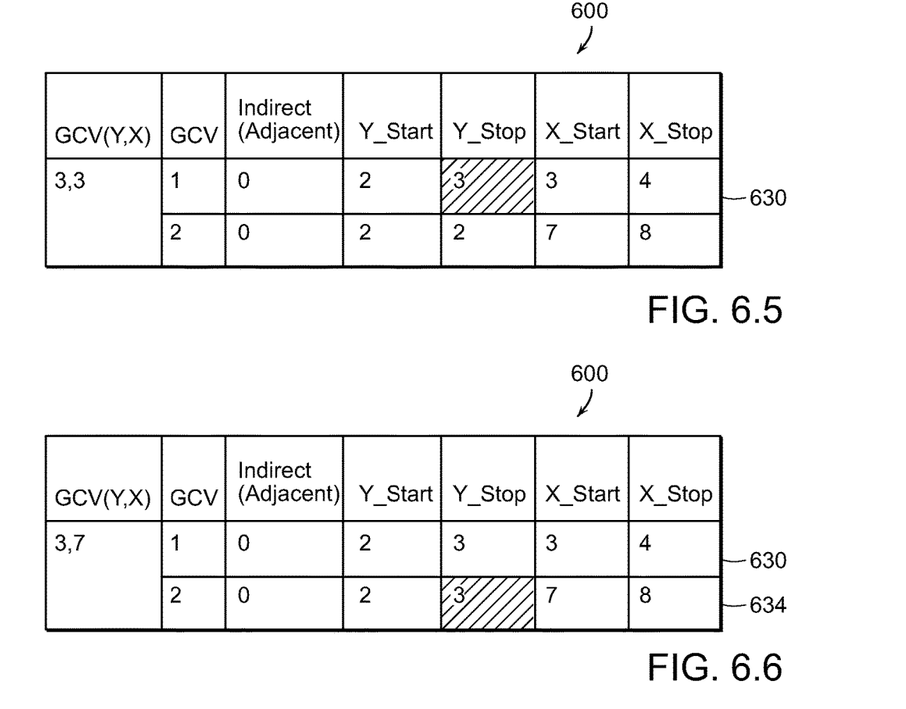

Referring to FIG. 6.5, when GCV(3,3)=1, which already has an entry 630, the Indirect (Adjacent) value remains "0" because there is no adjacent motion map pixel of a different value, the Y_Stop value 616 (shaded) changes to 3 and all other values remain unchanged.

Similarly, referring to FIG. 6.6, when GCV(3,7)=2 is processed, which already has an entry 634, the Indirect (Adjacent) value remains "0" because there is no adjacent motion map pixel of a different value, but the Y_Stop value 616 (shaded) changes to 3 while all other values remain unchanged.

Figure 67:
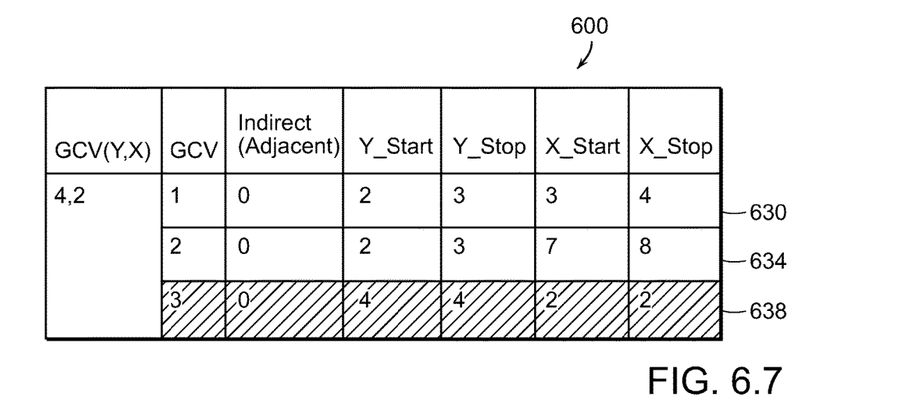

Similarly, referring to FIG. 6.7, when GCV(4,2)=3 is processed, a new entry 638 (shaded) is created, where the Indirect (Adjacent) value remains "0" because there is no adjacent motion map pixel of a different value, the Y_Start value 612 is 4, the Y_Stop value 616 is 4, the X_Start value 620 is 2; and the X_Stop value 624 is 2.

As mentioned above, the grouping table 600 also indicates when motion map pixels of different group values are "linked," i.e., adjacent, to one another, through the indirect (adjacent) index 608. More specifically, the indirect (adjacent) index 608 is updated when the left and top group counts are nonzero and do not match. Per the embodiments of the present invention, and discussed in more detail below, the indirect index information will propagate from the highest to lowest group count and the outer boundaries will be copied to the indirect group as represented in the following pseudo-code:

```
If(index!=0 and top!=0 and left!=0 and left != top)
    if(Indirect(index)=0)
        if(Indirect(top)=0) then
            Indirect(index)=top
        Else
            Indirect(index) = Indirect(top)
    End
    If (Y_Start(index)<Y_Start(Indirect(index))) then Y_Start(Indirect(index)) =Y_Start(index)
    If (Y_Stop(index) > Y_Stop(Indirect(index))) then Y_Stop(Indirect(index) ) = Y_Stop(index)
    If (X_Start(index) < X_Start(Indirect(index))) then X_Start(Indirect(index) ) = X_Start(index)
    If (X_Stop(index) > X_Stop(Indirect(index))) then X_Stop(Indirect(index) ) = X_Stop(index)
Else
    Call Multiple_Link( )
End
```

Where: index=GCV(Y, X), left=GCV(Y, X−1), top=GCV (Y−1, X)

Figure 68:
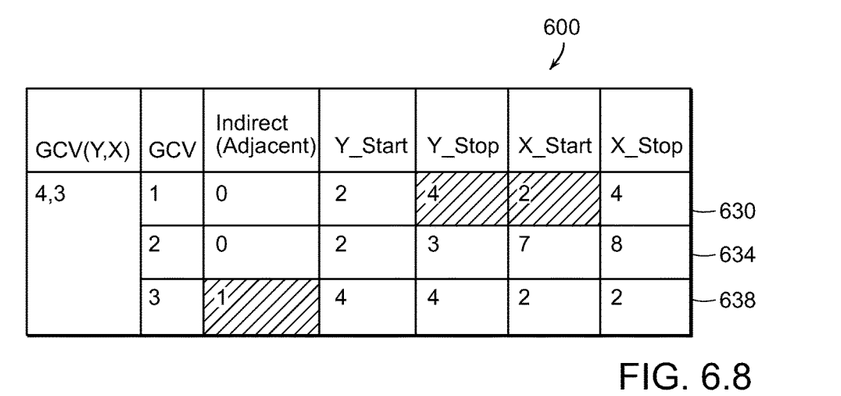

As an example of indirect indexing, referring now to FIG. 6.8, when the non-zero GCV(4,3)=3 is processed, which already has an entry 638 where the Indirect (Adjacent) value (shaded) becomes "1" because that is the value of the "top" adjacent motion map pixel GCV(3,3) of a different value, while all other values for GCV=3 remain unchanged.

As pixels with a GCV=1 and pixels with a GCV=3 are adjacent, still referring to FIG. 6.8, in the entry 630 for GCV=1, the Y_Stop value 616 (shaded) is changed to 4, to match the Y_Stop value 616 of entry 638 and the X_Start value 620 (shaded) is changed to 2 to match the X_Start value 620 of entry 638.

Figure 69:
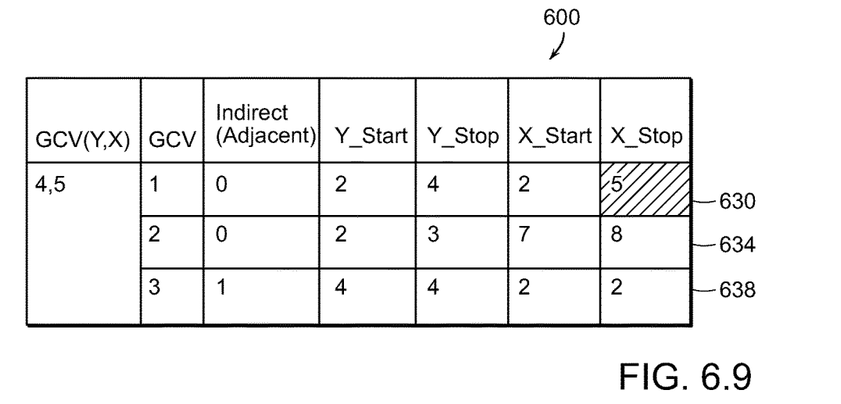

Referring now to FIG. 6.9, when the non-zero GCV(4,5) =3 is processed, which already has an entry 638 where the Indirect (Adjacent) value=1, then X_Stop value 624 (shaded) in entry 630 is changed to 5 to reflect the value for the GCV=3 entry of the current motion map pixel being processed.

Figure 610:
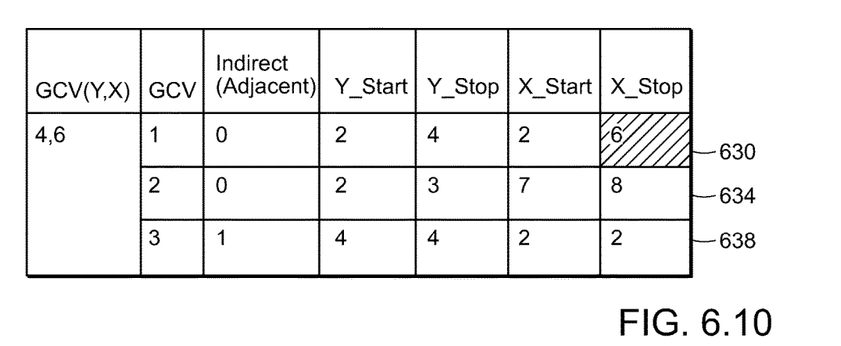

Referring now to FIG. 6.10, when the non-zero GCV(4, 6)=3, which already has an entry 638 where the Indirect (Adjacent) value=1, then X_Stop value 624 (shaded) in entry 630 is changed to 6 to reflect the value for the GCV=3 entry of the current motion map pixel being processed.

There may be the situation where two motion map pixels of a same group count value is each adjacent a motion map pixel of a different value. In that instance, a multiple link table 700 is used to represent when one group count value is indirectly linked, i.e., adjacent, to multiple other group count values.

Figure 71:
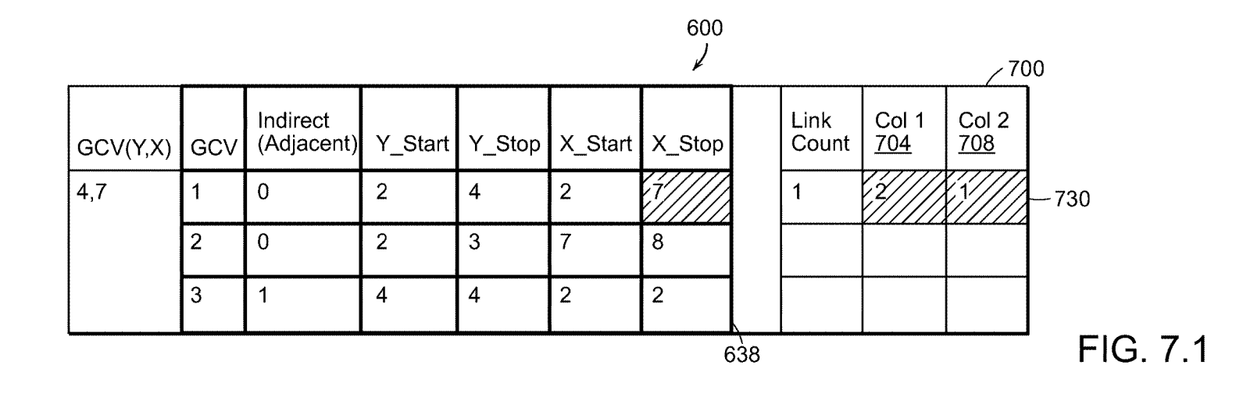
Figure 72:
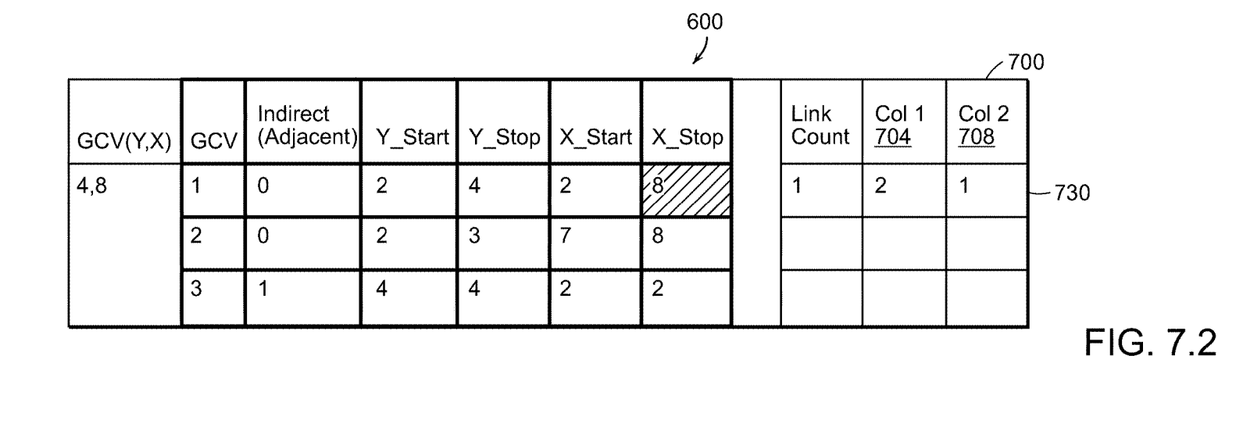
Figures 73, 74:
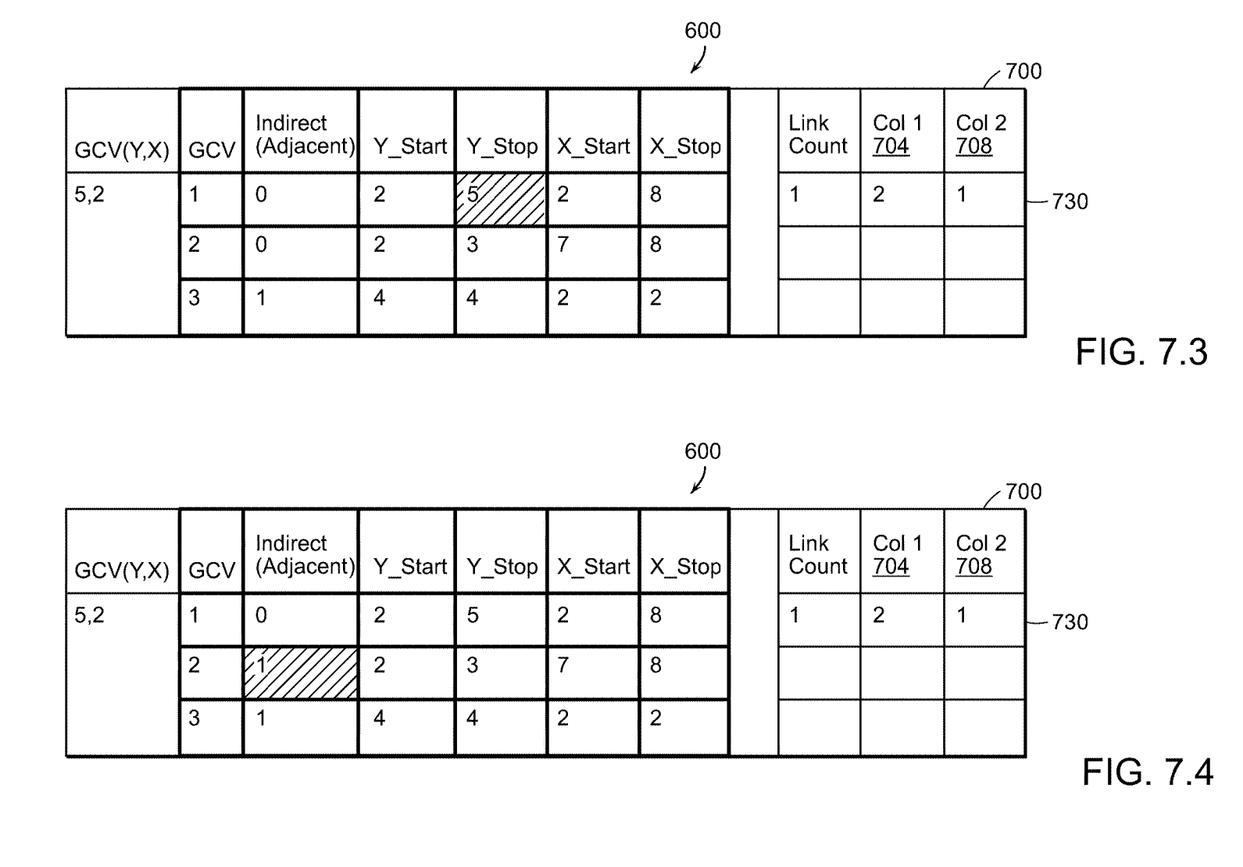

Referring now to FIGS. 7.1-7.3, the multiple link table 700 will have two columns 704, 708 to include information that links groups. The operations of this table will be described below in more detail.

The above-referenced call to the function Multiple_Link is represented by the following pseudo-code:

```
If(Indirect(index) != top and Indirect(index) != Indirect(top)) then
    if(Indirect(top) = 0 then
        Multiple_Link(link_count, 1) = top
    else
        Multiple_Link(link_count, 1) = Indirect(top)
    end
    Multiple_Link(link_count, 2) = Indirect(index)
    if(link_count>1)
        if(Multiple_Link(link_count, 1) != Multiple_Link(link_count-1, 1) or
           Multiple_Link(link_count, 2) != Multiple_Link(link_count-1, 2)
            link_count = link_count + 1
        end
    else
        link_count = link_count + 1
End
```

Referring now to FIG. 7.1, when the non-zero GCV(4,7)=3 is processed, which already has an entry 638 where the Indirect (Adjacent)=1, the (shaded) X_Stop value 624 for GCV=1 is changed to 7, to match the X_Stop value of the current motion map pixel being processed.

Subsequent processing of GCV(4,7)=3 indicates that this motion map pixel is adjacent to a motion map pixel having a group count value=2. The entry 638 for GCV=3, however, already indicates that it is adjacent GCV=1 so an entry indicating that GCV=2 is also linked, i.e., adjacent, to GCV=1 must be provided. Accordingly, an entry 730 is written to the multiple link table 700 indicating that GCV=2 is linked to GCV=1, as each is adjacent GCV=3, as recorded in the fields 704, 708, respectively.

Continuing, referring now to FIG. 7.2, when the non-zero GCV(4,8)=3 is processed, which already has an entry 638 and where the Indirect (Adjacent)=1, the (shaded) X_Stop value 624 for GCV=1 is changed to 8, to match the X_Stop value of the current motion map pixel being processed.

Continuing, referring now to FIG. 7.3, when the non-zero GCV(5,2)=3 is processed, which already has an entry 638 where the Indirect (Adjacent)=1, the (shaded) Y_Stop value 616 for GCV=1 is changed to 5, to match the Y_Stop value of the current motion map pixel being processed.

Once all of the motion map pixel data has been processed per the foregoing, coordinate values are swapped by reading through the entries in the multiple link table 700 to "swap" coordinates in the grouping table 600. This processing is represented by the following pseudo-code:

```
For i=1:link_count-1
    If(Y_Start(Multiple_Link(i, 1) < Y_Start(Multiple_Link(i, 2) then
        Y_Start(Multiple_Link(i, 2) = Y_Start(Multiple_Link(i, 1)
    End
    If(Y_Stop(Multiple_Link(i, 1) > Y_Stop(Multiple_Link(i, 2) then
        Y_Start(Multiple_Link(i, 2) = Y_Start(Multiple_Link(i, 1)
    End
    Repeat for X coordinates ...
    Indirect(Multiple_Link(i, 1)) = Multiple_Link(i, 2)
End
```

Referring now to FIG. 7.4, the multiple link table 700 is used to process the grouping table 600 in accordance with the foregoing. The outer coordinates for GCV=2 will be copied into the values for GCV=1. While no coordinate swaps are made in this case, the indirect index (shaded) for GCV=2 is entered as "1" to indicate the adjacency between the groups as per the information in the multiple link table 700.

Figure 8:
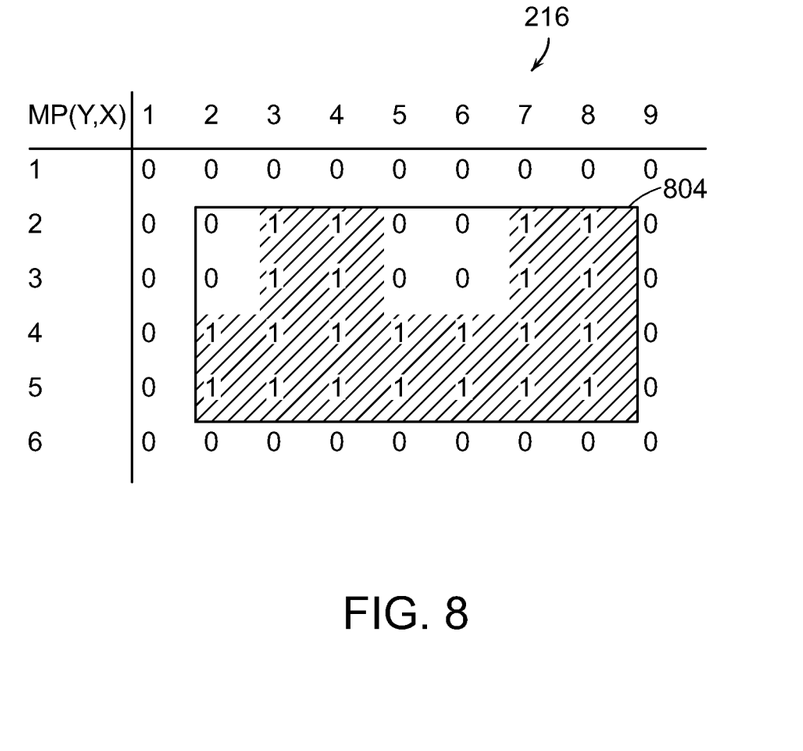
FIG. 8 is a representation of the motion map of FIG. 3 with a boundary identified in accordance with an embodiment of the present invention.
Figure 51:
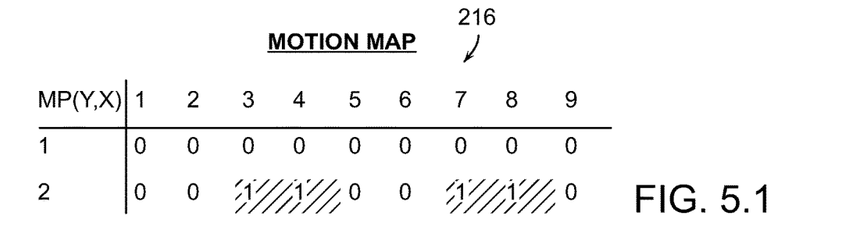
Figure 52:
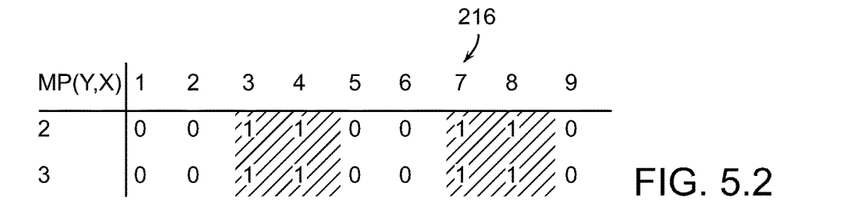
Figure 53:
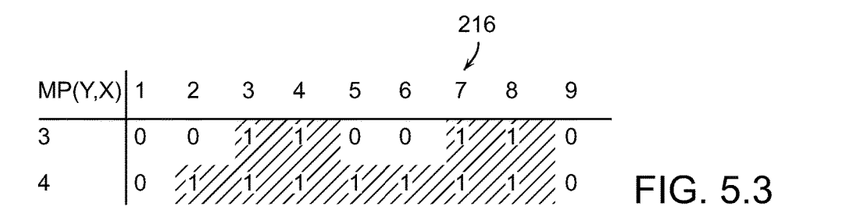
Figure 54:
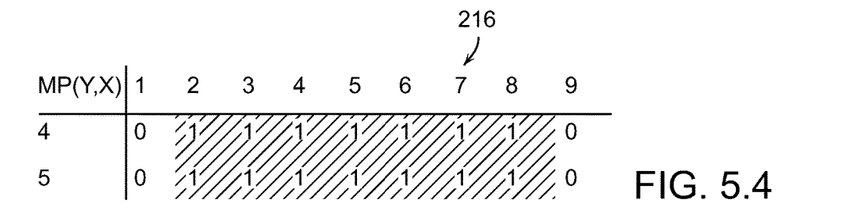
Figure 55:
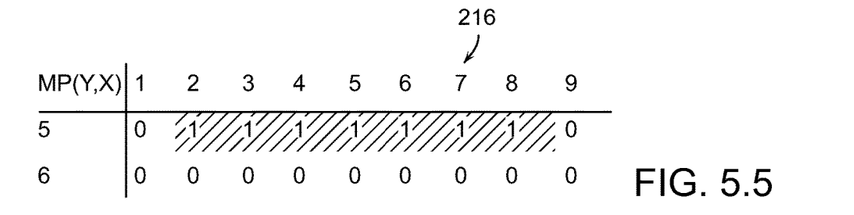

Once all of the motion map pixels have been processed, the final groups are those with a zero in the indirect index. Accordingly, as shown in FIG. 7.4, the entry for GCV=1 is the only row where the indirect index=0. The moving object is presented as having a boundary with corners at (Y_Start, X_Start); (Y_Start, X_Stop); (Y_Stop, X_Start); and (Y_Stop, X_Stop). Referring to FIG. 8, which is based on the motion map 216 in FIG. 3, a boundary 804, therefore, has corners at (2, 2); (2,8); (5,2); and (5,8).

Advantageously, embodiments of the present invention provide information regarding a boundary for a moving object in an image signal in situations where not necessarily all motion map pixels are identified as moving.

Various embodiments of the above-described systems and methods may be implemented in digital electronic circuitry, in computer hardware, firmware, and/or software. The implementation can be as a computer program product, i.e., a computer program tangibly embodied in an information carrier. The implementation can, for example, be in a machine-readable storage device and/or in a propagated signal, for execution by, or to control the operation of, data processing apparatus. The implementation can, for example, be a programmable processor, a computer and/or multiple computers.

While the above-described embodiments generally depict a computer implemented system employing at least one processor executing program steps out of at least one memory to obtain the functions herein described, it should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation.

It is to be understood that the present invention has been described using non-limiting detailed descriptions of embodiments thereof that are provided by way of example only and are not intended to limit the scope of the invention. Features and/or steps described with respect to one embodiment may be used with other embodiments and not all embodiments of the invention have all of the features and/or steps shown in a particular figure or described with respect to one of the embodiments. Variations of embodiments described will occur to persons of skill in the art.

It should be noted that some of the above described embodiments include structure, acts or details of structures and acts that may not be essential to the invention and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present invention. Therefore, the scope of the invention is limited only by the elements and limitations as used in the claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The invention claimed is:

1. A method of detecting a moving object in an image signal comprising a plurality of sequential image frames of a plurality of pixels (P), the method comprising:
   providing, with an image capture device, the image signal including the plurality of sequential image frames of the plurality of pixels (P);
   providing, by a motion detection module coupled to the image capture device, a motion map as a function of the image signal, the method further comprising, for each image frame:
      receiving, for each pixel (P) in the frame, a corresponding motion map pixel (MP) set to either a first motion value (FMV) or a second motion value (SMV) indicating that the pixel (P) is associated or is not associated, respectively, with an object in the image frame that is in motion with respect to a background;
      assigning a group count value (GCV) to each motion map pixel (MP) as a function of the motion values of adjacent motion map pixels;
      maintaining an indexed grouping table comprising outer pixel coordinates for a boundary about each group of pixels having a same group count value (GCV) and information representing two groups of pixels having different group count values adjacent to one another;
      determining if two different groups of pixels having different group count values are adjacent to one another by comparing the group count value (GCV) for each respective motion map pixel MP to the GCVs of two adjacent motion map pixels and, if so determined, updating the outer pixel coordinates of the group count value for the adjacent motion map pixel in the indexed grouping table;
      maintaining a multiple link table including information identifying a motion map pixel having a group count value GCV adjacent to two other motion map pixels each having a different group count value GCV;
      traversing the indexed grouping table and the multiple link table and determining pixel coordinates for a boundary that encompasses two or more adjacent groups of pixels having different group count values; and
      forwarding the boundary pixel coordinates to an object tracking system,
      wherein the boundary pixel coordinates identify the moving object in the image signal.

2. The method of claim 1, wherein assigning a group count value GCV to each motion map pixel comprises:
   comparing each motion map pixel MP(Y, X) to a first adjacent motion map pixel MP(Y,X−1) in the adjacent column (X−1) and a same row (Y) and to the motion map pixel MP(Y−1, X) in the adjacent row (Y−1) and same column (X),
   wherein Y indicates the row starting from a top of the image frame, and
   wherein X indicates the column starting from a left side of the image frame.

3. The method of claim 2, wherein assigning each motion map pixel MP(Y,X) a group count value further comprises, for each motion map pixel MP(Y, X):
   if motion map pixel MP(Y, X)=the first motion value FMV and neither of a first adjacent motion map pixel MP(Y−1, X) and a second adjacent motion map pixel MP(Y, X−1) equals the FMV then setting an indexed group count table entry GCV(Y, X)=a current group count value (CGCV) and then incrementing the current count value CGCV (CGCV=CGCV+1).

4. The method of claim 3, wherein assigning each motion map pixel MP(Y,X) a group count value further comprises:
   if motion map pixel MP(Y, X)=FMV and the first adjacent motion map pixel MP(Y−1, X)=FMV then setting the indexed group count table entry GCV(Y, X)=GCV(Y, X−1).

5. The method of claim 4, wherein assigning each motion map pixel MP(Y,X) a group count value further comprises:
   if motion map pixel MP(Y, X)=FMV and the second adjacent motion map pixel MP(Y, X−1)=FMV then setting the indexed group count table entry GCV(Y, X)=GCV(Y−1,X).

6. The method of claim 2, further comprising receiving the respective motion values for the pixels in a row-by-row manner.

7. The method of claim 3, further comprising storing a subset of all rows in the respective frame in a memory.

8. The method of claim 7, further comprising storing two adjacent rows of the respective frame at a time.

9. The method of claim 1, further comprising:
   receiving the corresponding motion map pixels in both a spatial and temporal order starting from a top left location to a bottom right location of the frame.

10. The method of claim 1, wherein determining if two different groups of pixels having different group count values are adjacent to one another further comprises, for a respective motion map pixel MP(Y,X):
    comparing GCV(Y,X) to GCV(Y,X−1) and to GCV(Y−1,X),
    wherein Y indicates the row starting from a top of the image frame, and
    wherein X indicates the column starting from a left side of the image frame.

11. A system for detecting a moving object in an image signal comprising a plurality of sequential image frames of a plurality of pixels (P), the system comprising:
    an image capture device configured to provide the image signal including the plurality of sequential image frames of the plurality of pixels (P);
    a motion detection module, coupled to the image capture device, configured to provide a motion map as a function of the image signal; and
    an object detection module, coupled to the motion detection module, configured to, for each frame:
       receive, for each pixel (P) in the frame, a corresponding motion map pixel (MP) having either a first motion value (FMV) or a second motion value (SMV) indicating that the pixel (P) is associated or is not associated, respectively, with an object in the image frame that is in motion with respect to a background;
       assign a group count value (GCV) to each motion map pixel (MP) as a function of the motion values of adjacent motion map pixels;
       maintain an indexed grouping table comprising outer pixel coordinates for a boundary about each group of pixels having a same group count value (GCV) and information representing two groups of pixels having different group count values adjacent to one another;
       determine if two different groups of pixels having different group count values are adjacent to one another by comparing the group count value (GCV) for each respective motion map pixel MP to the GCVs of two adjacent motion map pixels and, if so determined, update the outer pixel coordinates of the group count value for the adjacent motion map pixel in the indexed grouping table;

maintain a multiple link table including information identifying a motion map pixel having a group count value GCV adjacent to two other motion map pixels each having a different group count value GCV;

traverse the indexed grouping table and the multiple link table and determine pixel coordinates for a boundary that encompasses two or more adjacent groups of pixels having different group count values; and forward the boundary pixel coordinates to an object tracking system, wherein the boundary pixel coordinates identify the moving object in the image signal.

12. The system of claim 11, wherein assigning a group count value GCV to each motion map pixel comprises:

comparing each motion map pixel MP(Y, X) to a first adjacent motion map pixel MP(Y,X−1) in the adjacent column (X−1) and a same row (Y) and to the motion map pixel MP(Y−1, X) in the adjacent row (Y−1) and same column (X), wherein Y indicates the row starting from a top of the image frame, and wherein X indicates the column starting from a left side of the image frame.

13. The system of claim 12, wherein assigning each motion map pixel MP(Y,X) a group count value further comprises, for each motion map pixel MP(Y, X):

if motion map pixel MP(Y, X)=the first motion value FMV and neither of a first adjacent motion map pixel MP(Y−1, X) and a second adjacent motion map pixel MP(Y, X−1) equals the FMV then setting an indexed grouping table entry GCV(Y, X)=a current group count value (CGCV) and then incrementing the current count value CGCV (CGCV=CGCV+1).

14. The system of claim 13, wherein assigning each motion map pixel MP(Y,X) a group count value further comprises:

if motion map pixel MP(Y, X)=FMV and the first adjacent motion map pixel MP(Y−1, X)=FMV then setting the indexed grouping table entry GCV(Y, X)=GCV(Y,X−1).

15. The system of claim 14, wherein assigning each motion map pixel MP(Y,X) a group count value further comprises:

if motion map pixel MP(Y, X)=FMV and the second adjacent motion map pixel MP(Y, X−1)=FMV then setting the indexed grouping table entry GCV(Y, X)=GCV(Y−1,X).

16. The system of claim 12, wherein the object detection module is further configured to receive the respective motion values for the pixels in a row-by-row manner.

17. The system of claim 13, wherein the object detection module is further configured to store a subset of all rows in the respective frame in a memory.

18. The system of claim 17, wherein the object detection module is further configured to store two adjacent rows of the respective frame at a time.

19. The system of claim 11, wherein the object detection module is further configured to receive the corresponding motion map pixels in both a spatial and temporal order starting from a top left location to a bottom right location of the frame.

20. The system of claim 11, wherein determining if two different groups of pixels having different group count values are adjacent to one another further comprises, for a respective motion map pixel MP(Y,X):

comparing GCV(Y,X) to GCV(Y,X−1) and to GCV(Y−1,X), wherein Y indicates the row starting from a top of the image frame, and wherein X indicates the column starting from a left side of the image frame.

* * * * *